Patented June 3, 1924.

1,496,545

UNITED STATES PATENT OFFICE.

MAY CARTER JONES, OF SIGNAL MOUNTAIN, TENNESSEE.

MASSAGE CREAM.

No Drawing.   Application filed April 20, 1923.   Serial No. 633,525.

*To all whom it may concern:*

Be it known that I, MAY CARTER JONES, residing at Signal Mountain, Tennessee, a citizen of the United States, have invented certain new and useful Improvements in Massage Cream, of which the following is a specification.

The object of my invention is to provide an efficient and harmless preparation for reducing a person's flesh, and one which may be easily applied and which will not be attended with any disagreeable effect or consequences in its use, and my invention consists in whatever is defined by or is included within the terms or scope of the appended claims.

In what I now consider the best and most desirable embodiment of my invention it comprises the following materials or ingredients in the proportions named: soap chips one pound; Epsom salts one pound; one ounce of oil of bergamot; and one-half ounce of carmine.

The soap chips are dissolved in a quart of boiling water and then allowed to cool and solidify. The Epsom salts are dissolved in one pint of boiling water. The soap and Epsom salts are then beaten into a cream. When applied to the body the soap opens the pores and thereby the Epsom salts penetrates into the flesh and destroys the adipose tissue. The oil of bergamot is added to the preparation to make an agreeable perfume and the carmine is added to give an attractive color appearance to the preparation, but it would involve no departure from my invention to use other materials for perfume and coloring, or to omit them altogether.

My preparation is applied to that portion of the body which it is desired to reduce and is in the form of a paste which is rubbed lightly and massaged on the flesh at night upon retiring. It does not soil garments or bed clothing with which it may come in contact with while on the body.

What I claim is:

1. A preparation for application to flesh comprising a cream that contains a soap and Epsom salt.

2. A preparation for application to flesh comprising a cream that contains a pore-opening material and Epsom salt as a tissue reducing material.

3. A preparation for application to flesh comprising a cream that contains a soap and Epsom salt, the soap and the salt being in substantially equal parts.

In testimony whereof I hereunto affix my signature.

MRS. MAY CARTER JONES.